(12) United States Patent
Roesch et al.

(10) Patent No.: US 7,170,015 B1
(45) Date of Patent: Jan. 30, 2007

(54) ELECTRICAL BOX

(75) Inventors: Mark A. Roesch, Brecksville, OH (US); Dennis P. Revlock, Sr., Medina, OH (US)

(73) Assignee: The Lamson & Sessions Co., Cleveland, OH (US)

( * ) Notice: Subject to any disclaimer, the term of this patent is extended or adjusted under 35 U.S.C. 154(b) by 0 days.

(21) Appl. No.: 11/331,882

(22) Filed: Jan. 13, 2006

Related U.S. Application Data

(60) Provisional application No. 60/740,340, filed on Nov. 29, 2005.

(51) Int. Cl.
   *H02G 3/04* (2006.01)

(52) U.S. Cl. .................. 174/480; 174/481; 174/58; 248/342; 439/535

(58) Field of Classification Search .................. 174/50, 174/58, 480–481; 248/342–343, 906; 220/3.8, 220/3.2, 3.3, 3.9; 439/535
   See application file for complete search history.

(56) References Cited

U.S. PATENT DOCUMENTS

| | | | |
|---|---|---|---|
| 4,673,097 A * | 6/1987 | Schuldt ..................... 220/3.5 |
| 4,874,905 A | 10/1989 | Schnell et al. |
| 4,880,128 A | 11/1989 | Jorgensen |
| 5,234,119 A | 8/1993 | Jorgensen et al. |
| 5,407,088 A * | 4/1995 | Jorgensen et al. ........... 220/3.9 |
| 5,762,223 A | 6/1998 | Kerr |
| 5,854,443 A | 12/1998 | Reiker |
| 5,857,581 A | 1/1999 | Jorgensen |
| 5,950,853 A | 9/1999 | Jorgensen |
| 5,988,421 A | 11/1999 | Jorgensen |
| 6,107,568 A * | 8/2000 | Schnell et al. ................. 174/61 |
| 6,191,362 B1 | 2/2001 | Gretz |
| 6,207,897 B1 | 3/2001 | Reiker |
| 6,355,883 B1 | 3/2002 | Gretz |
| 6,509,524 B1 | 1/2003 | Gretz |
| 6,646,201 B1 | 11/2003 | Gretz |
| 6,722,621 B1 | 4/2004 | Johnson |
| 6,794,573 B1 | 9/2004 | Ofcharsky et al. |
| 6,827,229 B1 | 12/2004 | Dinh et al. |
| 6,924,431 B1 | 8/2005 | Ofcharsky et al. |
| 6,956,170 B1 | 10/2005 | Gretz et al. |
| 2005/0029257 A1 | 2/2005 | Dinh et al. |

* cited by examiner

*Primary Examiner*—Dhiru R. Patel
(74) *Attorney, Agent, or Firm*—Jones Day

(57) ABSTRACT

A joist has a front surface and first and second opposite side surfaces. The side surfaces extend in a rearward direction from the front surface. They also extend in a lateral direction perpendicular to the rearward direction. An electrical box has a hole configured to receive a fastener that fastens the box to the first side surface. The box further has a side wall and a rear wall together defining a cavity that is isolated by the box from the hole. The cavity is configured to extend along both side surfaces of the joist and to contain electrical connections. The side wall extends laterally beyond the hole and the rear wall is located rearwardly beyond the hole.

11 Claims, 3 Drawing Sheets

1

ELECTRICAL BOX

CROSS-REFERENCE TO RELATED APPLICATION

This application claims the benefit of U.S. Provisional Application No. 60/740,340, filed Nov. 29, 2005.

TECHNICAL FIELD

This application relates to electrical boxes.

BACKGROUND

An electrical box is used for connecting a ceiling fan or light fixture to a ceiling joist. The box is fastened to the joist and provides a compartment that contains electrical connections for the fan or fixture.

SUMMARY

A joist has a front surface and first and second opposite side surfaces. The side surfaces extend in a rearward direction from the front surface. They also extend in a lateral direction perpendicular to the rearward direction. An electrical box has a hole configured to receive a fastener that fastens the box to the first side surface. The box further has a side wall and a rear wall together defining a cavity that is isolated by the box from the hole. The cavity is configured to extend along both side surfaces of the joist and to contain electrical connections. The side wall extends laterally beyond the hole and the rear wall is located rearwardly beyond the hole.

Preferably, the cavity is configured to extend along the second side surface both rearwardly beyond the fastener hole and laterally beyond the fastener hole. The box has a tab that includes the hole and is isolated by the box from the cavity. The tab has a rear edge extending tangentially from the outer surface of the rear wall and a side edge extending tangentially from the outer surface of the side wall.

DESCRIPTION

Figure 1:
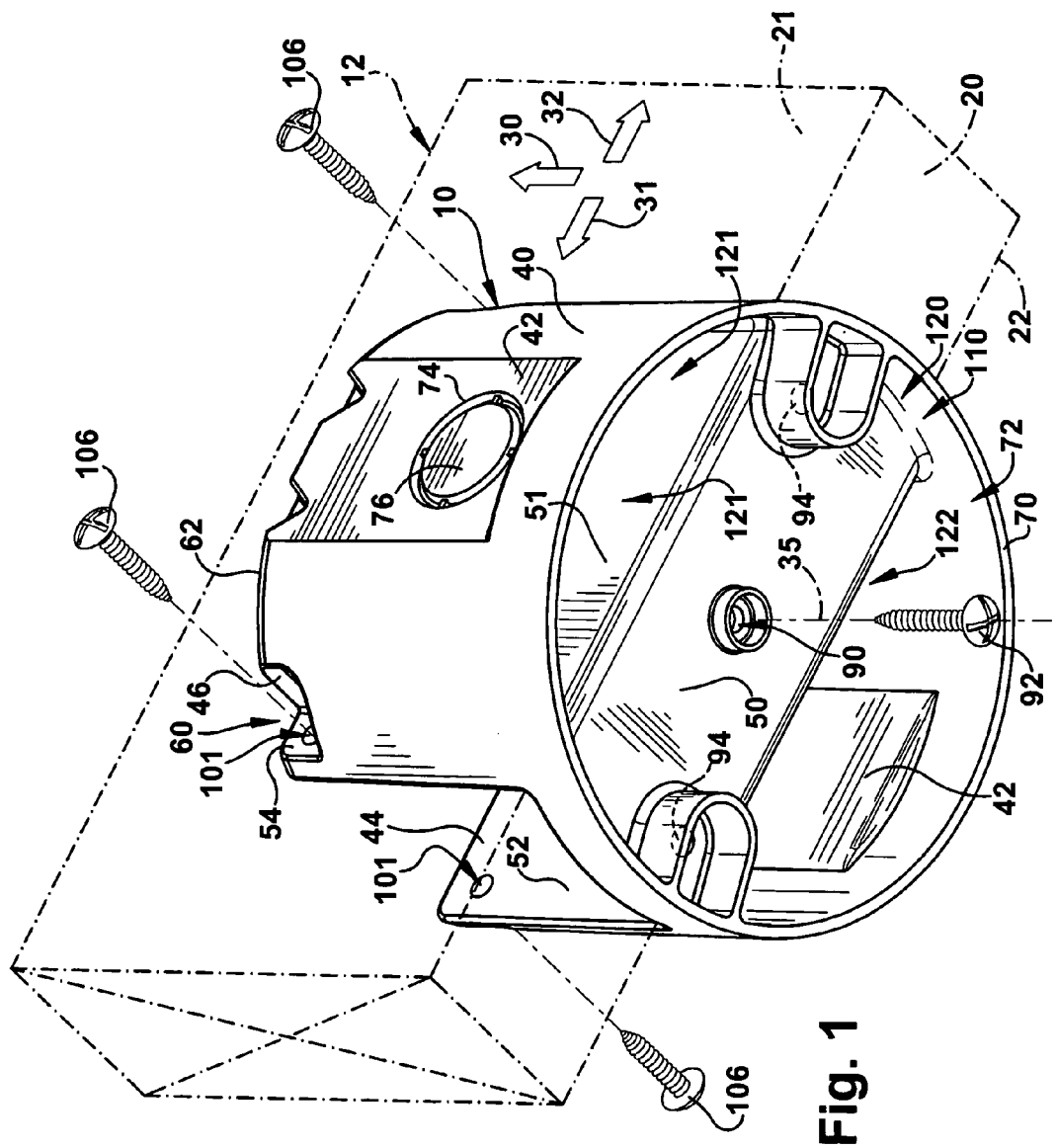
FIGS. 1 and 2 are perspective views of an electrical box.

The apparatus shown in FIG. 1 has parts that are examples of the elements recited in the claims. The apparatus thus includes examples of how a person of ordinary skill in the art can make and use the claimed invention. It is described here to meet the requirements of enablement and best mode without imposing limitations that are not recited in the claims.

The apparatus includes a saddle-shaped electrical box 10 fastened to a ceiling joist 12. The box 10 is configured to contain electrical connections for an electrical fixture, such as a light fixture or ceiling fan.

Figure 2:
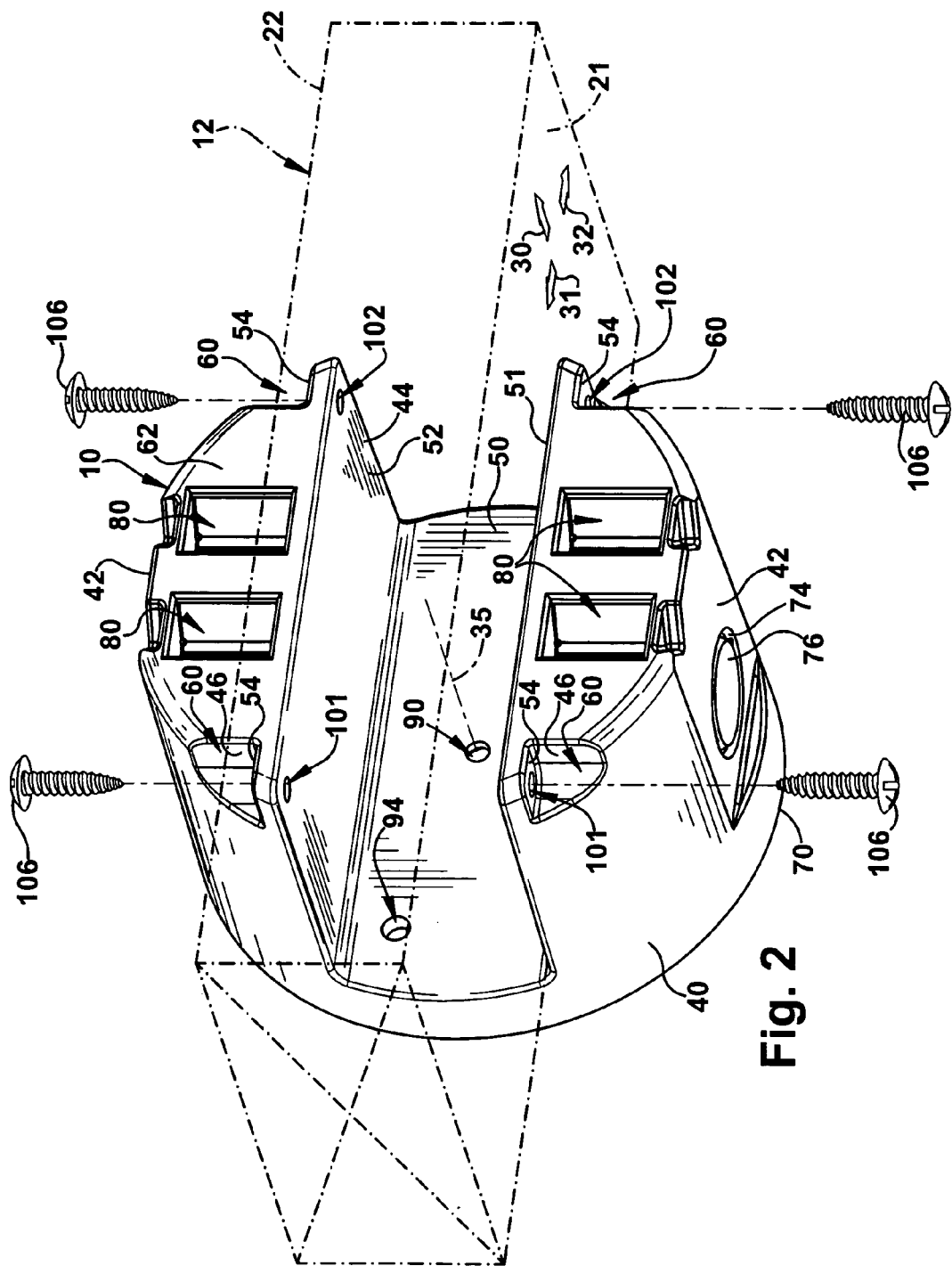

The joist 12 has a front surface 20 and first and second opposite side surfaces 21 and 22. The side surfaces 20 and 22 extend in a rearward direction 30 from the front surface 20 and in a opposite first and second lateral directions 31 and 32 perpendicular to the rearward direction 30. The box 10 is configured to be mounted on the joist 12 as shown in FIGS. 1 and 2.

2

The box 10 is a wall structure with several wall sections described as follows: A cylindrical side wall 40 is centered on an axis 35 and has a slight frustoconical taper, narrowing slightly in the rearward direction 30. The cylindrical wall 40 is interrupted by two axially opposite flat side walls 42, a U-shaped channel wall 44, and four curved tab-framing walls 46. The channel wall 44 includes a front panel 50 and first and second side panels 51 and 52, respectively overlying the front surface 20 and first and second side surfaces 21 and 22 of the joist 12. Four corner portions 54 of the side plates 51 and 52 define four tabs that are bounded by the respective tab-framing walls 46. Each tab 54 and its adjoining tab-framing wall 56 define a recess 60 in the cylindrical wall 62. The cylindrical, flat, U-shaped and tab-framing walls 40, 42, 44 and 46 comprise a "side wall". The side wall is capped by a flat rear wall 62 that is divided by the channel 44 into two separate parts.

The walls described above have a variety of openings: An annular front edge 70 of the cylindrical wall 40 defines a front access opening 72 through which a user inserts fingers and tools into the box 10 to prepare the electrical connections. Each flat wall 42 has an annular groove 74 defining a knock-out 76 that can be removed to leave an opening for receiving an electrical conduit or fitting. The rear wall 62 has four cable clamps 80 for admitting electrical cables into the box 10 and clamping the cables in place. The channel's front panel 50 has a central hole 90, centered on the axis 35, through which a fastener 92 can be inserted to fasten the box 10 to the joist's front surface 20. The channel's front panel 50 further has two side holes 94, spaced symmetrically across the axis 35 from each other. They receive fasteners that fasten a bracket of the electrical fixture to the joist's front surface 20 while the bracket abuts the annular front edge 70. Each tab 54 has a hole 101 or 102 through which a fastener 106 fastens the box 10 to a side surface 21 or 22 of the joist 12.

The side wall and the rear wall 62 together define a compartment 110 for containing the electrical connections between electrical supply cable and wires from the electrical fixture. The compartment 110 is U-shaped with three sections: A front section 120 extends along the front channel wall 50 and thus along the joist front surface 20. First and second side sections 121 and 122 extend respectively along the first and second side panels 51 and 52, and thus respectively along the joist's first and second side surfaces 21 and 22. The compartment 110 is isolated from the four tabs 54 and their holes 101 and 102 by the four tab-framing walls 46 of the box 10.

The positions of the tabs 54 and their holes 101 and 102 have the following features that optimize support of the box 10 with efficient use of space. Since the first and second side compartment sections 121 and 122 are alike, the beneficial features can be described with reference to the first section 121 as follows.

Figure 3:
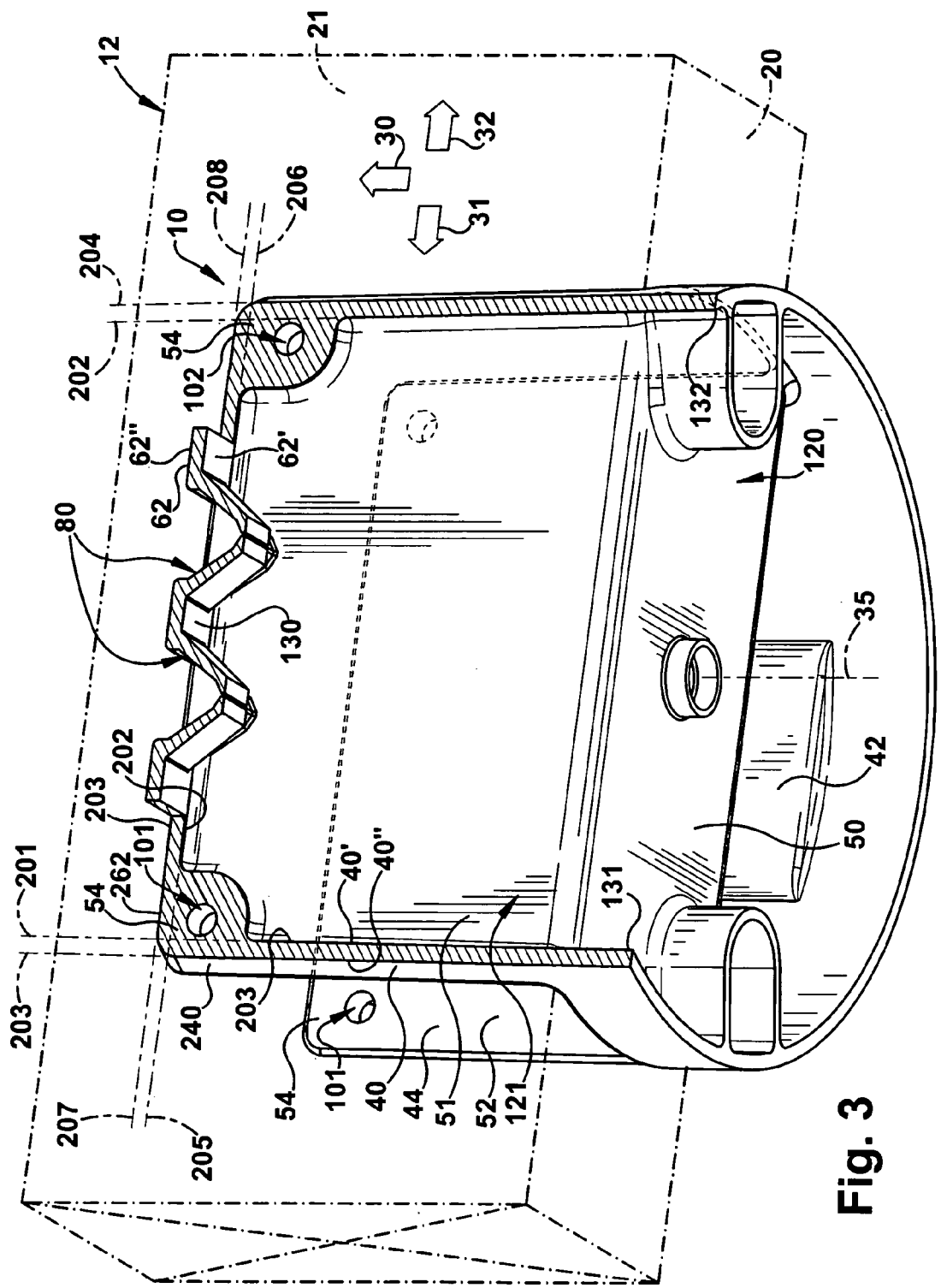
FIG. 3 is a sectioned perspective view of the box.

As shown in FIG. 3, a rearmost point 130 of the compartment 121 is rearward from the tab holes 101 and 102. A first lateral-most point 131 in the compartment 121 is laterally beyond the first tab hole 101 in the first lateral direction (arrow 31), and a second lateral-most point 132 in the compartment 121 is laterally beyond the second tab hole 102 in the opposite second lateral direction (arrow 32).

First and second imaginary lines 201 and 202 extend parallel with and rearwardly beyond the inner surface 40' of the cylindrical wall 40. These lines 201 and 202 are not exactly parallel to each other, because the cylindrical wall 40 is slightly frustoconical. Similarly, third and fourth imaginary lines 203 and 204 extend parallel with and rearwardly beyond the outer surface 40″ of the cylindrical wall 40. These four imaginary lines 201, 202, 203 and 204 are located laterally beyond their adjacent tab holes 101 and 102.

Fifth and sixth imaginary lines 205 and 206 extend parallel with the inner surface 62′ of the rear wall 62. Similarly, seventh and eighth imaginary lines 207 and 208 extend parallel with the outer surface 62″ of the rear wall 62. These four imaginary lines 205, 206, 207 and 208 are located rearwardly beyond their adjacent tab holes 101 and 102.

Each tab 54 has a linear side edge 140 extending tangentially from the box's outer side surface 40″ and a linear rear edge 262 extending tangentially from the box's rear surface 62″. The tabs 54 do not extend laterally beyond the cylindrical side wall 40 nor rearwardly beyond the rear wall 62.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have elements that do not differ from the literal language of the claims, or if they include equivalent structural elements with insubstantial differences from the literal language of the claims.

The invention claimed is:

1. An apparatus for use with a joist having a front surface and first and second opposite side surfaces, the side surfaces extending in a rearward direction from the front surface and also in a lateral direction perpendicular to the rearward direction, the apparatus comprising:

an electrical box having a hole configured to receive a fastener that fastens the box to the first side surface, and further having a side wall extending about and bounding a cavity and a rear wall rearwardly bounding the cavity, the cavity being isolated by the box from the hole and configured to contain electrical connections and to extend along both joist side surfaces, with the side wall extending in the lateral direction beyond the hole and the rear wall located rearwardly beyond the hole;

wherein the box has a tab that includes the hole and that is isolated by the box from the cavity.

2. An apparatus for use with a joist having a front surface and first and second opposite side surfaces, the side surfaces extending in a rearward direction from the front surface and also in a lateral direction perpendicular to the rearward direction, the apparatus comprising:

an electrical box having a hole configured to receive a fastener that fastens the box to the first side surface, and further having a side wall extending about and bounding a cavity and a rear wall rearwardly bounding the cavity, the cavity being isolated by the box from the hole and configured to contain electrical connections and to extend along both joist side surfaces, with the side wall extending laterally beyond the hole and the rear wall located rearwardly beyond the hole;

wherein the box has a tab that includes the hole and that has a rear edge that is tangent to an outer surface of the rear wall and a side edge that is tangent to an outer surface of the side wall.

3. An apparatus for use with a joist having a front surface and first and second opposite side surfaces, the side surfaces extending in a rearward direction from the front surface and also in a lateral direction perpendicular to the rearward direction, the apparatus comprising:

an electrical box having a first hole configured to receive a fastener that fastens the box to the first side surface, and further having a side wall extending about and bounding a cavity and a rear wall rearwardly bounding the cavity, the cavity being isolated by the box from the first hole and configured to contain electrical connections and to extend along both joist side surfaces, with the side wall extending in the lateral direction beyond the first hole and the rear wall located rearwardly beyond the first hole;

the box further having a second hole isolated from the cavity by the box and configured to receive a second fastener that fastens the box to the second side surface, and the side wall extends in the lateral direction beyond the second hole, and the rear wall is located rearwardly beyond the second hole.

4. An apparatus for use with a joist having a front surface and first and second opposite side surfaces, the side surfaces extending in a rearward direction from the front surface and also in a lateral direction perpendicular to the rearward direction, the apparatus comprising:

an electrical box having a hole configured to receive a fastener that fastens the box to the first side surface, the box defining a cavity that is isolated from the hole by the box, the cavity being configured to contain electrical connections and to extend along the first side surface rearwardly beyond the hole and laterally beyond the hole and to extend also along the second side surface;

wherein the box has a cylindrical side wall and a rear wall that define the cavity, and further has a tab that has the hole and a rear edge extending tangentially from an outer surface of the rear wall and a side edge extending tangentially from an outer surface of the side wall.

5. An apparatus for use with a joist having a front surface and first and second opposite side surfaces, the side surfaces extending in a rearward direction from the front surface and also in a lateral direction perpendicular to the rearward direction, the apparatus comprising:

an electrical box having a first hole configured to receive a first fastener that fastens the box to the first side surface, the box defining a cavity that is isolated from the first hole by the box, the cavity being configured to contain electrical connections and to extend along the first side surface rearwardly beyond the first hole and laterally beyond the first hole;

wherein the box has a second hole isolated from the cavity by the box and configured to receive a second fastener that fastens the box to the second side surface, and the cavity extends along the second side surface rearwardly beyond the second hole and laterally beyond the second hole.

6. An apparatus for use with a joist having a front surface and first and second opposite side surfaces, the side surfaces extending in a rearward direction from the front surface and also in a lateral direction perpendicular to the rearward direction, the apparatus comprising:

an electrical box having a hole configured to receive a fastener that fastens the box to the first side surface, the box defining a cavity that is isolated from the hole by the box, the cavity being configured to contain electrical connections and to extend along the first side surface rearwardly beyond the hole and laterally beyond the hole and to extend also along the second side surface;

wherein the box includes first and second side panels configured to overlie the first and second side surfaces to separate the joist side surfaces from the cavity.

7. The apparatus of claim 6 wherein the box has a tab that has the hole and that extends from and is coplanar with the first side panel.

8. An apparatus for use with a joist having a front surface and first and second opposite side surfaces, the side surfaces extending in a rearward direction from the front surface and also in a lateral direction perpendicular to the rearward direction, the apparatus comprising:
   an electrical box having a side wall extending about and bounding a cavity configured to extend along the first and second side surfaces and to contain electrical connections, and further having, in a recess in the side wall, a hole configured to receive a fastener that fastens the box to the first side surface;
   wherein the hole is in a tab of the box.

9. An apparatus for use with a joist having a front surface and first and second opposite side surfaces, the side surfaces extending in a rearward direction from the front surface and also in a lateral direction perpendicular to the rearward direction, the apparatus comprising:
   an electrical box having a tab with a hole configured to receive a fastener that fastens the box to the first side surface, and further having a side wall and a rear wall that define a cavity configured to extend along the first and second side surfaces and to contain electrical connections, the tab having a rear edge extending tangentially from an outer surface of the rear wall and a side edge extending tangentially from an outer surface of the side wall.

10. The apparatus of claim 9 wherein the tab is in a recess in the side wall.

11. An apparatus for use with a joist having a front surface and first and second opposite side surfaces, the side surfaces extending in a rearward direction from the front surface and also in a lateral direction perpendicular to the rearward direction, the apparatus comprising:
   an electrical box having a hole configured to receive a fastener that fastens the box to the first side surface, the box defining a cavity that is isolated from the hole by the box, the cavity being configured to contain electrical connections and to extend along the first side surface rearwardly beyond the hole and in the lateral direction beyond the hole and to extend also along the second side surface;
   wherein the cavity is configured to extend along the second side surface rearwardly beyond the hole and in the lateral direction beyond the hole.

* * * * *